United States Patent [19]

Friederichs et al.

[11] Patent Number: 4,567,415

[45] Date of Patent: Jan. 28, 1986

[54] SYSTEM FOR CONTROLLING THE MOVEMENT OF AN INDUSTRIAL MANIPULATOR

[75] Inventors: Karl-Heinz Friederichs, Kiel; Joachim Schlapkohl, Klausdorf, both of Fed. Rep. of Germany

[73] Assignee: Blohm & Voss AG, Hamburg, Fed. Rep. of Germany

[21] Appl. No.: 599,177

[22] Filed: Apr. 11, 1984

[30] Foreign Application Priority Data

Apr. 11, 1983 [DE] Fed. Rep. of Germany ....... 3312939

[51] Int. Cl.[4] .............................................. G05B 23/02
[52] U.S. Cl. ..................................... 318/565; 318/568
[58] Field of Search ................. 318/568, 565; 364/513

[56] References Cited

U.S. PATENT DOCUMENTS

| | | | |
|---|---|---|---|
| 4,030,012 | 6/1977 | Buhler | 318/565 |
| 4,209,734 | 6/1980 | Osder | 318/565 X |
| 4,366,423 | 12/1982 | Inaba et al. | 318/565 X |
| 4,375,611 | 3/1983 | Greig | 318/565 X |
| 4,490,660 | 12/1984 | Tsuchihashi | 318/565 |
| 4,491,884 | 1/1985 | Carey et al. | 318/565 X |
| 4,495,453 | 1/1985 | Inaba et al. | 318/568 |

FOREIGN PATENT DOCUMENTS

| | | |
|---|---|---|
| 1293500 | 4/1969 | Fed. Rep. of Germany . |
| 2840341 | 4/1979 | Fed. Rep. of Germany . |
| 3151752 | 8/1982 | Fed. Rep. of Germany . |

Primary Examiner—B. Dobeck
Attorney, Agent, or Firm—Nils H. Ljungman

[57] ABSTRACT

In each drive direction of a degree of freedom, or in each of the drive directions of several degrees of freedom, the industrial robot is provided with an absolute measured value transmitter or transducer and a relative measured value transmitter which give the instantaneous position of the drives. Should the signal put out by the absolute measured value transmitter not fall within a preselected range of a first window circuit, the robot will be switched off via the control because the robot is moving in a unpermitted working region. The reference position can be chosen with the aid of a second window circuit whose window lies within the range of the first window circuit.

11 Claims, 1 Drawing Figure

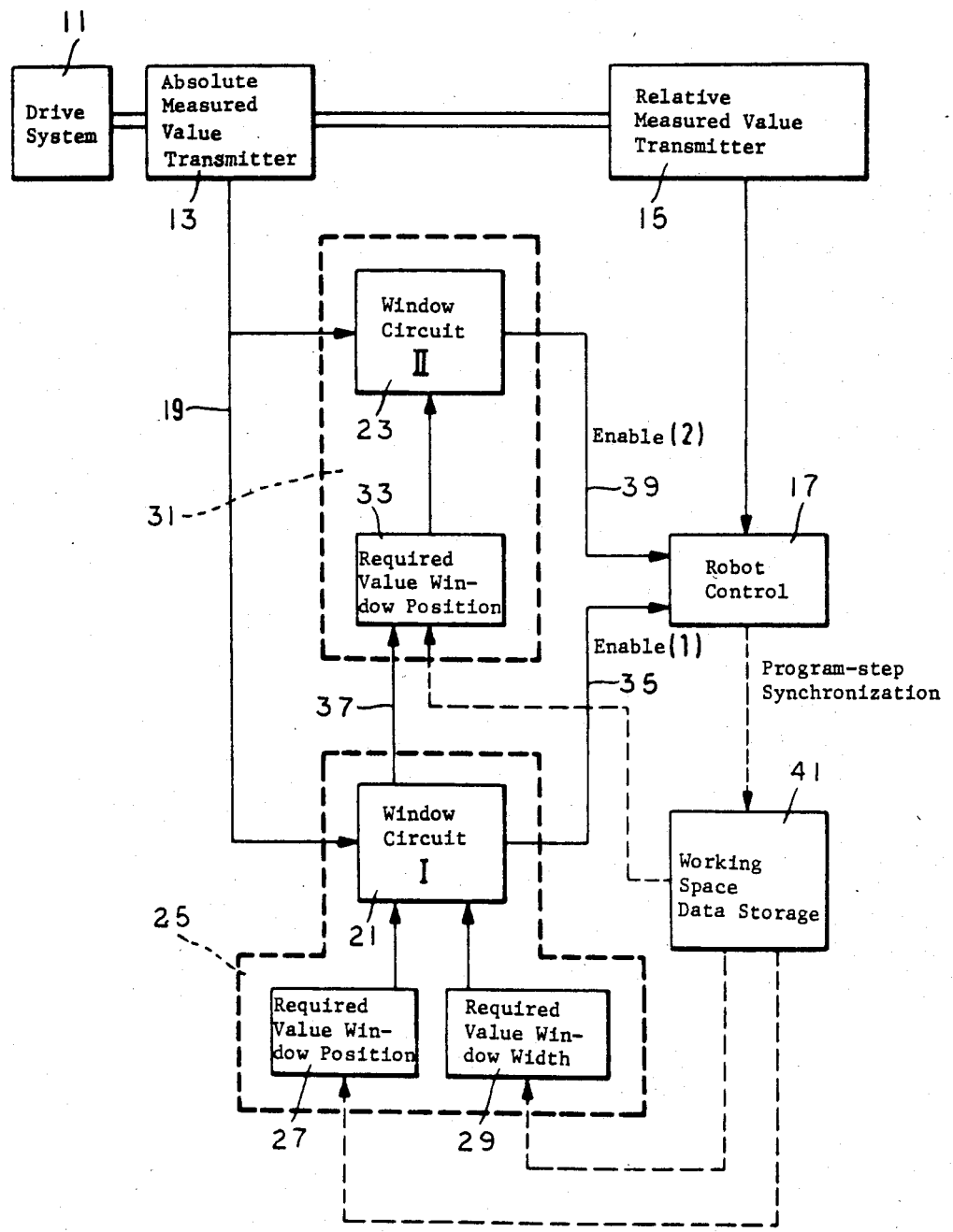

SYSTEM FOR CONTROLLING THE MOVEMENT OF AN INDUSTRIAL MANIPULATOR

BACKGROUND OF THE INVENTION

1. Field of the Invention

The invention relates to industrial manipulators and, more particularly, the invention is directed to a technique for effecting the control of a robot's movement through at least one degree of freedom.

2. Description of the Prior Art

In virtually every application of an industrial manipulator or robot, it is necessary to exercise a specific level of control to the ranges of angular freedom, the working strokes and the like, and for reasons of safety, standing obstacles, overload damage prevention and various other factors. Control of the range of movements available to a given manipulator can be a critical consideration in flexible manufacturing cell applications. Typically, a flexible manufacturing cell incorporates two or more structurally independent industrial manipulators which are integrated for the purpose of a coordinated work effort. Unless exact control of the movement of each manipulator is assured, self-inflicted damage to one or more of the several manipulators in a cell is a serious possibility. While such problems may not arise when the working range of a single industrial manipulator is limited to an individual degree of freedom which can be fully traversed without encountering any obstacles, such a simple situation is normally not the case.

A typical solution utilized to limit the working strokes, such as axially based rotational displacement and other movements, is by means of mechanical stops, or the like. However, various problems are commonly associated with mechanical stops. In the first place, the mechanical stops must be very rugged in order to withstand the force or shearing moment generated by industrial manipulators designed for heavy duty applications, otherwise the stops could be either moved or even destroyed by the movements of the industrial manipulators. An additional problem arises with industrial robots having several degrees of freedom in their normal operations because the permissible angles of rotation or movement in any given degree of freedom can be effected by such motions in one or more of the remaining degrees of freedom. If various types of job assignments are to be carried out by a single industrial manipulator, as is the case with the several manipulators in a flexibly, arrangeable or programmable manufacturing cell or installation, the mechanical stops must be moved quite frequently. Repositioning the mechanical stops is not only a taxing and time-consuming operation, but it is also an operation which can involve considerable safety risks. In a flexible manufacturing cell, the problem becomes all the more troublesome, the more often the manipulator's controlling program is changed.

Similar problems are also encountered when an operator is "setting-up" or defining the limits of travel for a given degree of freedom in an industrial manipulator. By "setting-up" what is meant is the procedure whereby the agreement between the mechanical null or zero position of one's drive mechanism's axis and the null position of a then-assigned transmitter is established. By using absolute value transmitters, this measure is required only once, as for example, upon the installation or the replacement of a transmitter. On the other hand, the aforedescribed measure is required after each re-insertion of the control if use is made of periodically or cyclically operating measured value transmitters which, hereinafter, will be designated as relative measured value transmitters.

Since measured value transmitters (sensors) which have high resolving power, which are accurate and which have the absolute value form of construction are extremely expensive and of a rather large size, use is predominantly made of the smaller and more cost-favorable relative transducers, especially incremental transmitters. However, the use of such incremental transmitters requires that setting-up becomes a task to be carried out relatively frequently.

The free area of movement, which, in many installation, is restricted by external conditions as described above, frequently does not permit the use of the generally common null mark of the transmitter employed to produce the desired reference setting since, for example, this angular setting could lie entirely in a region which cannot be traversed by the robot's arm due to the fact than an obstacle is present. In this case, in conventional stepups, the transmitters must be released and—departing from the normal setting—the transmitter must be so rotated that alignment is possible in a traversable region.

OBJECTS OF THE INVENTION

It is therefore an object of this invention to provide an improved technique for effecting limit control over the movement of an industrial manipulator through at least one degree of freedom.

It is another object of this invention to provide an improved technique whereby stop-limit control can be effected through two or more degrees of freedom.

It is yet a further object of this invention to provide an electronic system for effecting the movement stop limit of an industrial manipulator which readily lends itself to modifications in an easier and more reliable manner.

SUMMARY OF THE INVENTION

An industrial robot equipped with drive devices for movements in at least one degree of freedom has a control system which includes an absolute value transmitter and a relative value transmitter with several reference marks lying within the working range thereof. A first and a second electronic window circuit react with the output signal from the absolute value transmitter and emit a first output signal when the signal emitted by the absolute value transmitter lies in a specified position range, and emit a second output signal when the signal put out by the absolute value transmitter lies outside the said position range. The arrangement is such that circuit means are provided for adjusting the location of the positional range for both window circuits and the width of the positional range for the first window circuit. The position range of the second window circuit lies within the first window circuit. Moreover, each degree of freedom available to an industrial manipulator can be provided with the aforedescribed transmitters and window circuits. Additionally, the location of the positional range for both window circuits and the width of the positional range for the first window circuit can be programmably modified as required through the use of a microprocessor or similar circuitry.

BRIEF DESCRIPTION OF THE DRAWING

The above, as well as other features and advantages of the present invention, can be more readily appreciated through consideration of the detailed description of the invention in conjunction with the sole FIGURE which is a block diagrammatic representation of an industrial manipulator control system all according to the teachings of this invention.

DETAILED DESCRIPTION OF PREFERRED EMBODIMENTS

This invention provides a technique for effecting the control of an industrial manipulator through at least one degree of freedom. This technique is accomplished in accordance with this invention by tracking the position of each movable or articulated member in each degree of freedom available thereto. The industrial manipulator is provided with an absolute value transmitter and a relative value transmitter having several working marks within the working range. A first and a second electronic window circuit are responsive to the output signals from the absolute value transmitter. The electronic windows emit a first output signal when the signal from the absolute value transmitter lies within a specified position range, and they emit a second output signal when the absolute value transmitter's signal lies outside this specified position range. This arrangement include circuit means which provide for the setting of the position of the range of both window circuits and the width of the position range for the first window circuit. A key factor to this relationship is the fact that position range of the second window circuit lies within the range of the first.

Thus, on the one hand, with the robot incorporating the control system of the invention, there is provided an absolute value transmitter or transducer for the one or more drive systems of the degree or degrees of freedom which, however, need not give the instantaneous position with excessive precision. Rather, accurate setting is effected with the aid of the relative value transmitter. A first and a second window circuit now respond to the signal from the absolute value transmitter. These window circuits only transmit releasing signals to the robot's drive system when the position of the robot is located in this drive axis and hence the signal put out by the absolute value transmitter is between a pre-set smallest value and a pre-set largest value. In all other cases, a signal is emitted by means of which either the robot is locked in automatic operation or, by non-detection of the reference signal of the remainder, is prevented from going into automatic operation. The first permitted working range is set by the first window circuit. The second window range has a relatively narrower and always constant width. Should the robot carry out a movement with a drive axis in the corresponding degree of freedom, the signal from the absolute value transmitter will then traverse the window range of the second window circuit, because this window range lies within the window range of the first window circuit, that is, within the permitted working range for a drive axis belonging to this degree of freedom. As soon as the second window circuit begins to traverse this window range, the said window circuit transmits an output signal to the control circuit, on the basis of which the next reference mark signal of the relative value transmitter is treated as a reference position or a reference pulse. Obviously, in the process, it is unnecessary for the relative measured value transmitter actually to emit a pulse; it is, however, very advantageous to reshape its output signals at least into pulse-form.

Should the robot move still further into the drive axis of this degree of freedom, the absolute value transmitter's signal will then leave the window range of the first window circuit. In this case, the window circuit's output signal, which is applied to the control circuit, will be so changed that the robot will be switched off in order to prevent damage to either the robot itself or the equipment proximate thereto or, more importantly, nearby operators.

Devices of this type can now be provided for each degree of freedom of such a robot. In such cases, suitable circuits are required for each drive axis associated with each of these degrees of freedom. For each program, it then becomes necessary to readjust the window positions and window widths of the two window circuits. However, the necessary adjustments can be effected with the aid of setters in the control cabinet, a procedure which is much simpler than shifting stops or measured value transducers in order to change the null setting on the robot itself. However, an appreciably greater advantage resides in the fact that the setting of the window can be effected automatically when means are provided for programmably changing the window's position and width. Should the robot have run through its movement work cycle, the window width and position can be adjusted anew at all time with the aid of the program so that, at all times, it is ensured that in none of its degrees of freedom can the robot move out of the permitted movement range.

The invention will now be described by way of example on the basis of an advantageous embodiment, with reference to the appended drawing.

An industrial robot which is not illustrated herein is equipped with a drive system, indicated in block diagrammatic form and indicated by the reference character 11, for movement in at least one degree of freedom. Connected to the direction of movement of a given degree of freedom as, for example, to a stroke direction or a rotating axis are an absolute measured value transmitter or transducer 13 and a relative measured value transmitter 15. The absolute measured value transmitter can, for example, emit an analog signal which corresponds to the size and direction of the angle of rotation of an axis or extension or retraction. The relative measured value transmitter 15 will, from time to time, generate an output pulse when the movement in the degree of freedom concerned has progressed by a certain amount (as, for example, 1 mm or a specified fraction of a degree). The pulses from the relative measured value transmitter 15 are transmitted in the process to the control 10 for the robot drive system. In addition, the relative measured value transmitter 15 transmits in angular distances, which are larger than those used for angle-measuring, separate reference mark impulses to the control 17.

On the other hand, the signals from the absolute measured value transmitter 13 are fed via conductors 19 to a first window circuit 21 and to a second window circuit 23. The first window circuit 21 includes associated control circuitry means generally indicated by the broken line enclosure 25. This control circuitry includes circuitry 27 to establish the required value window position and circuitry 29 to adjust the required value of the window width. The second window circuit 23 includes associated control circuitry means indicated at 31 which comprises required value window position circuitry 33 for varying the position of the fixed width window 23.

With the first window circuit 25, it is possible to adjust the position of the window and to adjust the said window's width. Should the moving part of the robot be located in the permitted range and, as a result, should the signal from the absolute measured value transmitter 13 have the value corresponding to that which lies within the window of the window circuit 21, an enable (1) signal will be transmitted over conductor 35 to the control 17 so that the robot can carry out the desired movements.

The window position of the second window circuit 31 can be set, but the width of this window always has the same value. Be means of suitable circuits, it can be additionally ensured, via a connecting conductor 37, that the window range of the second window circuit 23 will lie within the window range of the first window circuit 21.

If the signal from the absolute measured value transmitter 13 is within the window range of the second window circuit 23, an enable (2) signal is sent via conductor 39 to the control 17, so that the next reference mark impulse put out by the relative measured value transmitter 15 is used by the control 17 as the valid reference mark (null mark). By this means, it is easy to effect the null setting or "adjusting" for all drive axes of all degrees of freedom of the robot, when the devices described above are provided for all the drive axes belonging to this degree of freedom.

The setting of the window position and window width can be readily effected manually for a single program. When changing one program for another, having previously been used, it is, however, advantageous to carry out this setting with the aid of a working-space data storage system 41 (via the broken lines). Thus, stored in the outer storage unit 41 are the ranges which the robot can traverse in a degree of freedom when it assumes already specified positions in the other degrees of freedom. In this case, the setting can be effected, if necessary, in accordance with specific program steps.

Where, in the above, mention is made of axes, not only are rotation axes to be understood, but also translational axes. What has been described is a system for controlling the movements of an industrial manipulator or robot having drive mechanism for movement through at least one degree of freedom.

The invention, as described hereinabove in the context of a preferred embodiment, is not to be taken as limited to all of the provided details thereof, since, modification and variations thereof may be made without departing from the spirit and scope of the invention.

What is claimed is:

1. A movement control system for use with an industrial manipulator having drive means for movement in at least one degree of freedom comprising:
    an absolute value transmitter means operably associated with said industrial manipulator, said absolute value transmitter generating a first output signal reflective of the movement in at least one degree of freedom;
    a relative value transmitter means operably associated with said industrial manipulator, said relative value transmitter generating a second output signal reflective of several reference marks within said at least one degree of freedom;
    a first window circuit defining a first predetermined positional range and a second window circuit defining a second predetermined positional range which second range lies within the first range, responsive to said first output signal, said window circuits transmitting releasing signals which permit actuation of the drive means when the position of the industrial manipulator is within said predetermined positional range.

2. The movement control system according to claim 1 wherein the first window circuit includes circuit means to adjust the positional range and positional location thereof with respect to the at least one degree of freedom.

3. The movement control system according to claim 2 wherein the second window circuit includes circuit means to adjust the positional location thereof with respect to the at least one degree of freedom.

4. The movement control system according to claim 1 wherein the industrial manipulator is capable of movement through several degrees of freedom each of which degree of freedom is monitored by an absolute value transmitter and a relative value transmitter and first and second window circuits operatively associated therewith.

5. The movement control system according to claim 3 including circuit means operatively associated with the first and second window circuits for programmably changing the window positional range and positional location.

6. The movement control system according to claim 1 wherein the relative value transmitter second output signal provides a reference or null mark to which the industrial manipulator drive means is responsive.

7. A movement control system for use with an industrial manipulator capable of movement through two or more degrees of freedom and having separate drive means for movement in each of the two or more degrees of freedom wherein said movement control system for each said separate drive means comprises:
    an absolute value transmitter means operably associated with said industrial manipulator, said absolute value transmitter generating a first output signal reflective of the movement in a selected degree of freedom;
    a relative value transmitter means operably associated with said industrial manipulator, said relative value transmitter generating a second output signal reflective of several reference marks within said selected degree of freedom; and
    a first window circuit defining a first predetermined positional range and a second window circuit defining a second predetermined positional range which second range lies within the first range, responsive to said first output signal, said window circuits transmitting releasing signals which permit actuation of the drive means when the position of the industrial manipulator is within said predetermined positional range.

8. The movement control system according to claim 1 wherein the first window circuit includes circuit means to adjust the positional range and positional location thereof with respect to the at least one degree of freedom.

9. The movement control system according to claim 8 wherein the second window circuit includes circuit means to adjust the positional location thereof with respect to the at least one degree of freedom.

10. The movement control system according to claim 7 including circuit means operatively associated with the first and second window circuits for programmably changing the window positional range and positional location.

11. The movement control system according to claim 7 wherein the relative value transmitter second output signal provides a reference or null mark to which the industrial manipulator drive means is responsive.

* * * * *